US006630787B2

United States Patent
Van Der Pol et al.

(10) Patent No.: US 6,630,787 B2
(45) Date of Patent: Oct. 7, 2003

(54) LOW-PRESSURE MERCURY-VAPOR DISCHARGE LAMP HAVING ELECTRODE SHIELD CARRYING DIRECT ELECTRIC CURRENT

(75) Inventors: Adrianus Johannes Hendricus Petrus Van Der Pol, Eindhoven (NL); Peter Arend Seinen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 129 days.

(21) Appl. No.: 09/801,632

(22) Filed: Mar. 8, 2001

(65) Prior Publication Data

US 2001/0026128 A1 Oct. 4, 2001

(30) Foreign Application Priority Data

Mar. 9, 2000 (EP) ............................. 00200837

(51) Int. Cl.[7] ........................... H01J 17/20; H01J 61/12
(52) U.S. Cl. ..................... 313/574; 313/492; 313/613; 313/642
(58) Field of Search ............... 313/492, 556, 313/558, 608, 574, 613, 642

(56) References Cited

U.S. PATENT DOCUMENTS

| 2,692,350 | A | * | 10/1954 | Arnott | 313/114 |
| 4,117,374 | A | * | 9/1978 | Witting | 313/339 |
| 4,308,650 | A | * | 1/1982 | Hernandez et al. | 313/42 |
| 4,680,505 | A | * | 7/1987 | Funada et al. | 313/271 |
| 5,841,222 | A | * | 11/1998 | Heuvelmans et al. | 313/345 |
| 5,977,702 | A | * | 11/1999 | Nieda | 313/491 |
| 6,445,121 | B1 | * | 9/2002 | Roes et al. | 313/240 |

FOREIGN PATENT DOCUMENTS

DE  1060991  7/1959

* cited by examiner

Primary Examiner—Ashok Patel
Assistant Examiner—Glenn Zimmerman

(57) ABSTRACT

A low-pressure mercury-vapor discharge lamp is provided with a discharge vessel and a first and a second end portion (12a). The discharge vessel encloses a discharge space provided with a filling of mercury and an inert gas in a gastight manner. Each end portion (12a) supports an electrode (20a) arranged in the discharge space. An electrode shield (22a) encompasses the electrodes (20a) and, according to the invention, carries an electric current during operation, and is at a temperature $\geq 250°$ C., preferably $\geq 450°$ C., during nominal operation of the discharge lamp. Preferably, a first current supply conductor (30a) electrically contacts a first current divider (23a), which is electrically connected to a second current divider (23a') via a shell-shaped body (24a). Said second current divider (23a') electrically contacts the electrode (20a), which is connected to the second current supply conductor (30a'), the electrode shield (22a) is made from stainless steel, in particular a chromium nickel steel. Preferably, the heat dissipation of the electrode shield (22a) during nominal operation ranges between 0.1 and 10 Watts. Preferably, the electrode shield (22a) is made from a ceramic material or carbon. The discharge lamp exhibits a comparatively low mercury consumption.

10 Claims, 2 Drawing Sheets

LOW-PRESSURE MERCURY-VAPOR DISCHARGE LAMP HAVING ELECTRODE SHIELD CARRYING DIRECT ELECTRIC CURRENT

BACKGROUND OF THE INVENTION

1. Field of the Invention

The invention relates to a low-pressure mercury-vapor discharge lamp comprising a discharge vessel, which said discharge vessel encloses a discharge space containing a filling of mercury and an inert gas in a gastight manner, electrodes being arranged in the discharge space for maintaining a discharge in said discharge space, and an electrode shield surrounding at least one of the electrodes.

2. Discussion of the Prior Art

In mercury-vapor discharge lamps, mercury is the primary component for (efficiently) generating ultraviolet (UV) light. An inner surface of the discharge vessel may be coated with a luminescent layer containing a luminescent material (for example a fluorescent powder) for converting UV to other wavelengths, for example to UV-B and UV-A for tanning purposes (sunbed lamps) or to visible radiation for general illumination purposes. Such discharge lamps are therefore also referred to as fluorescent lamps. Low-pressure mercury-vapor discharge lamps comprise a generally tubular discharge vessel which is circular in section, and which includes elongated as well as compact embodiments. In general, the tubular discharge vessel of so-called compact fluorescent lamps comprises a collection of comparatively short, straight parts having a comparatively small diameter, which straight parts or connected to one another by means of bridge parts or by means of, for example, arch-shaped parts. Compact fluorescent lamps are generally provided with a lamp cap (with integrated electronics).

A low-pressure mercury-vapor discharge lamp of the type mentioned in the opening paragraph is known from DE-A 1 060 991. In said known lamp, the electrode shield surrounding the electrode is made from thin sheet titanium. By using an electrode shield, which is also referred to as anode shield or cathode shield, blackening at an inner surface of the discharge vessel is counteracted. In this respect, titanium serves as the getter for chemically binding oxygen, nitrogen and/or carbon.

A drawback of the use of such an electrode shield is that the titanium in the electrode shield may amalgamate with the mercury present in the lamp and, thus, absorb mercury. As a result, the known lamp requires a relatively high dose of mercury to obtain a sufficiently long service life. Injudicious processing of the known lamp after its service life has ended adversely affects the environment.

SUMMARY OF THE INVENTION

It is an object of the invention to provide a low-pressure mercury-vapor discharge lamp of the type mentioned in the opening paragraph, which consumes comparatively little mercury.

In accordance with the invention, this object is achieved in that the electrode shield carries an electric current during operation, and the temperature of the electrode shield during nominal operation is above 250° C.

In the description and the claims of the current invention, the designation "nominal operation" is used to indicate operating conditions in which the mercury vapor pressure is such that the radiant efficacy of the lamp is at least 80% of that during optimum operation, i.e. operating conditions in which the mercury vapor pressure is optimal.

For the proper operation of low-pressure mercury-vapor discharge lamps, the electrodes of such discharge lamps include an (emitter) material having a low so-called work function (reduction of the work function voltage) for supplying electrons to the discharge (cathode function). Known materials having a low work function are, for example, barium (Ba), strontium (Sr) and calcium (Ca). It has been observed that, during operation of low-pressure mercury-vapor discharge lamps, material (barium and strontium) of the electrode(s) is subject to evaporation. It has been found that, in general, the emitter material is deposited on the inner surface of the discharge vessel. It has further been found that Ba (and Sr) which is deposited elsewhere in the discharge vessel no longer participates in the electron-emission process. The deposited (emitter) material further forms mercury-containing compounds, for example amalgams, on the inner surface, as a result of which the quantity of mercury available for the discharge decreases (gradually), which may adversely affect the service life of the lamp. In order to compensate for such a loss of mercury during the service life of the lamp, a relatively high dose of mercury in the lamp is necessary, which is undesirable from the point of view of environmental protection.

The provision of an electrode shield, which surrounds the electrode(s) and, during operation, carries an electric current and, during nominal operation, is at a temperature above 250° C., causes the reactivity of materials in the electrode shield relative to the mercury present in the discharge vessel, leading to the formation of amalgams (Hg—Ba, Hg—Sr), to be reduced.

A preferred embodiment of the low-pressure mercury-vapor discharge lamp is characterized in accordance with the invention in that the temperature of the electrode shield during nominal operation exceeds 450° C.

At temperatures above 450° C., the mercury abstracted from the discharge by amalgamation is released again. Particularly HgO and mercury-containing Ba and Sr compounds dissociate at a temperature of 450° C. or higher. By using an electrode shield which is heated to a temperature of 450° C. or higher, mercury is released from the compounds of mercury and oxides of emitter material. A particularly suitable temperature of the electrode shield is approximately 500° C., at which temperature the dissociation of said compounds takes place relatively rapidly.

The known lamp comprises an electrode shield of thin sheet titanium, which material relatively readily amalgamates with mercury. The mercury consumption of the discharge lamp is limited by substantially reducing the degree to which the material of the electrode shield, which surrounds the electrode(s), reacts with mercury and/or bonds with mercury.

In operation, the electrode shield is customarily heated by the heat radiated by the electrode. It has been recognized by the inventors that it is advisable to heat up the electrode shield to the desired temperature. To achieve this, a preferred embodiment of the low-pressure mercury-vapor discharge lamp is characterized in that the electrode shield electrically contacts the electrode via a current conductor.

In general, the discharge vessel of the low-pressure mercury-vapor discharge lamp is provided with a first and a second current-supply conductor, which issue from the discharge vessel (10) to the exterior. Heating up of the electrode shield preferably takes place by the first current-supply conductor electrically contacting the electrode shield and the second current-supply conductor electrically contacting the electrode. By virtue thereof, the electric current that flows to the electrode via the current-supply conductors also flows through the electrode shield.

In order to obtain an electrode shield which can be heated to such high temperatures during nominal operation of the discharge lamp and, during operation, is capable of maintaining said high temperatures throughout the service life of the discharge lamp, the electrode shield is preferably manufactured from a metal or a metal alloy which can withstand temperatures of 450° C. or higher. An "electrode shield which can withstand high temperatures" is to be taken to mean in the description of the current invention, that, during the service life of the discharge lamp and at said temperatures, the material from which the electrode shield is manufactured does not show signs of degassing and/or evaporation, which adversely affect the operation of the discharge lamp, and that no appreciable changes in shape occur in the electrode shield at such high temperatures.

In order to reach the desired temperature of the electrode shield during nominal operation of the discharge lamp, the current flowing through (a current-carrying portion of) the electrode shield, during operation, causes energy in the form of heat to be dissipated in the electrode shield. In a preferred embodiment of the low-pressure mercury-vapor discharge lamp in accordance with the invention, the conductivity of the current-carrying portion of the electrode shield is such that, during nominal operation, the power dissipation lies in a range from 0.1 to 10 Watts. The electric resistance of the current-carrying portion of the electrode shield is determined by the resistivity of the material used for the current-carrying portion of the electrode shield and the dimensions (length and width, and the ratio of length to width) of the current-carrying portion. It is desirable that the current passage through the electrode determines the current intensity available for the electrode shield. In low-pressure mercury-vapor discharge lamps, the current intensity through the electrode, also referred to as the lamp current, generally lies in the range from approximately 200 mA to approximately 1 A. The power dissipation preferably lies in the range from 0.5 to 5 watts.

In a particularly favorable low-pressure mercury-vapor discharge lamp, the electrode shield is made from a ceramic material or carbon. Ceramic materials and carbon are resistant to high temperatures. Such materials have a high corrosion resistance, a relatively low coefficient of thermal conduction and a relatively poor thermal emissivity in comparison with the known materials. By virtue thereof it becomes possible to manufacture a stainless steel electrode shield, which can relatively readily reach temperatures above 450° C. by exposure to heat originating from the electrode.

A ceramic material which is particularly suitable for the manufacture of the electrode shield is aluminum oxide. A particularly suitable electrode shield is manufactured from so-called densely sintered $Al_2O_3$, also referred to as DGA. To obtain the desired conductivity, use can also suitably be made of doped ceramic materials, such as so-called cermets (DGA doped with molybdenum and/or tungsten).

In an alternative embodiment, the current-carrying portion of the electrode shield comprises an electroconductive coating which is applied to the electrode shield. For such a conductive coating use can be made of metals, for example gold, silver or aluminum, or of carbon. For the coating use can also suitably be made of ITO (indium tin oxide), ATO (antimony tin oxide), disilicides and carbides. The thickness of the conductive coating and the resistivity of the material determine the conductivity of the material.

In a particularly favorable embodiment of the low-pressure mercury-vapor discharge lamp in accordance with the invention, the electrode shield is provided, at a side facing away from the electrode, with a low-emissivity coating for reducing the radiation losses of the electrode shield. By applying such a layer to an outer surface of the electrode shield, the desired relatively high temperatures of the electrode shield can be reached more readily. The low-emissivity coating preferably comprises chromium or a noble metal, for example gold. Other materials which can suitably be used for a low-emissivity coating on the outer surface of the electrode shield are titanium nitride, chromium carbide, aluminum nitride and silicon carbide.

In an alternative embodiment of the low-pressure mercury-vapor discharge lamp, the electrode shield is polished on a side facing the discharge. Also a polishing treatment of the outer surface of the electrode shield causes the heat radiation by the electrode shield to be reduced.

In a further alternative embodiment of the low-pressure mercury-vapor discharge lamp, the electrode shield is provided, at a side facing the electrode, with an absorbing coating for absorbing radiation. By applying a layer having a relatively high emissivity in the infrared radiation range, the heat-absorbing capacity of the electrode shield is increased. By virtue thereof, the desired relatively high temperatures of the electrode shield can be reached more readily. The absorbing coating preferably comprises carbon.

Electrodes in low-pressure mercury-vapor discharge lamp are generally elongated and cylindrically symmetric, for example a coil with windings about a longitudinal axis. A tubular electrode shield harmonizes very well with such a shape of the electrode. Preferably, an axis of symmetry of the electrode shield extends substantially parallel to, or substantially coincides with, the longitudinal axis of the electrode. In the latter case, the average distance from an inside of the electrode shield to an external dimension of the electrode is at least substantially constant.

Preferably, the electrode shield is further provided with a slit. A slit in the electrode shield in the direction of the discharge increases the feasibility and/or the mounting of the shield. The slit preferably extends parallel to the axis of symmetry of the electrode shield (so-called lateral slit in the electrode shield). Preferably, the slit is directed towards the discharge space and brings about a relatively short discharge path between the electrodes of the low-pressure mercury-vapor discharge lamp. This is favorable for a high efficiency of the lamp. In the known lamp, the aperture or slit in the electrode shield faces away from the discharge space.

The electrode shield is generally held in the desired positioned around the electrode by means of a support wire, which support wire can be mounted in the discharge vessel in various ways. In an alternative embodiment of the low-pressure mercury-vapor discharge lamp, a support wire carries the electrode shield.

These and other aspects of the invention will be apparent from and elucidated with reference to the embodiments described hereinafter.

DETAILED DESCRIPTION OF PREFERRED EMBODIMENTS

Figure 1:
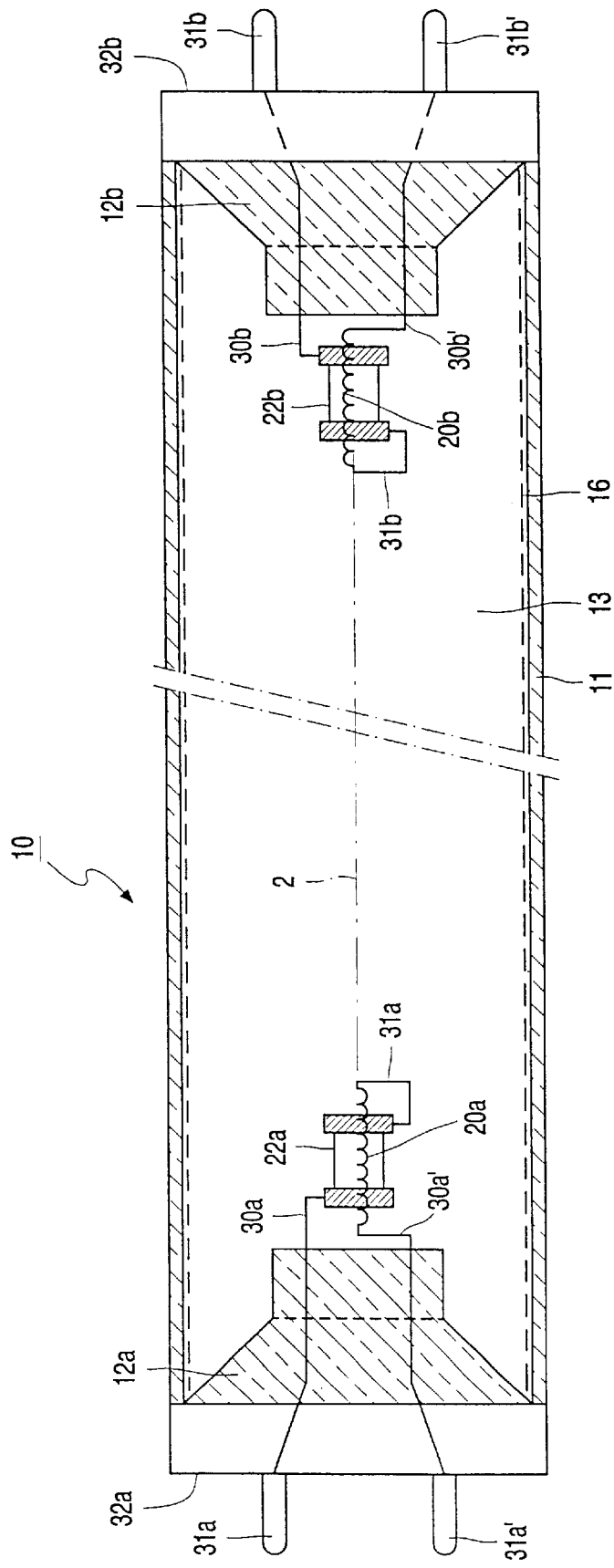
FIG. 1 is a cross-sectional view of an embodiment of the low-pressure mercury-vapor discharge lamp in accordance with the invention in longitudinal section.

The Figures are purely schematic and not drawn to scale. Particularly for clarity, some dimensions are exaggerated strongly. In the Figures, like reference numerals refer to like parts whenever possible.

FIG. 1 shows a low-pressure mercury-vapor discharge lamp comprising a glass discharge vessel 10 having a tubular part 11 about a longitudinal axis 2, which discharge vessel transmits radiation generated in the discharge vessel 10 and is provided with a first and a second end portion 12a; 12b, respectively. In this example, the tubular part 11 has a length of 120 cm and an inside diameter of 24 mm. The discharge vessel 10 encloses, in a gastight manner, a discharge space 13 containing a filling of less than 3 mg mercury and an inert gas, for example argon. The wall of the tubular part is generally coated with a luminescent layer 16 which includes a luminescent material (for example a fluorescent powder), which converts the ultraviolet (UV) light generated by relaxation of the excited mercury into (generally) visible light. The end portions 12a; 12b each support an electrode 20a; 20b arranged in the discharge space 13. The electrode 20a; 20b is a winding of tungsten covered with an electron-emitting substance, in this case a mixture of barium oxide, calcium oxide and strontium oxide. In the example illustrated in FIG. 1, the discharge vessel is provided with a first current-supply conductor 30a, 30a' and a second current-supply conductor 30b, 30b', which pass through the end portions 12a; 12b and issue from the discharge vessel 10 to the exterior. The current-supply conductors 30a, 30a'; 30b, 30b' are connected to contact pins 31a, 31a'; 31b, 31b' which are secured to a lamp cap 32a, 32b. In general, around each electrode 20a; 20b an electrode ring is arranged (not shown in FIG. 1) on which a glass capsule for proportioning mercury is clamped. In an alternative embodiment, an amalgam comprising mercury and an alloy of PbBiSn is provided in an exhaust tube (not shown in FIG. 1) which is in communication with the discharge vessel 10.

In the example of the low-pressure mercury-vapor discharge lamp shown in FIG. 1, the electrode 20a; 20b is surrounded by an electrode shield 22a; 22b, which electrically contacts the electrode 20a; 20b via a current conductor 31a; 31b. As is also shown in FIG. 1, the first current-supply conductor 30a; 30b electrically contacts the electrode 20a; 20b, and the second current-supply conductor 30a'; 30b' electrically contacts the electrode shield 22a; 22b. In this manner, the electric current which flows through the electrode 20a; 20b during operation also flows through the electrode shield 22a; 22b and hence the electrode shield 22a; 22b is heated to the desired temperature. In operation, the electrode shield 22a; 22b carries an electric current, as a result of which the temperature of the electrode shield 22a; 22b during nominal operation of the low-pressure mercury-vapor discharge lamp exceeds 250° C. Preferably, the energy dissipation in the electrode shield 22a; 22b is so large that, during nominal operation, the temperature of the electrode shield 22a; 22b exceeds 450° C. At said temperatures, no mercury is bonded to the surface of the electrode shield 22a; 22b, so that it remains available for the discharge in the discharge space. A particularly suitable temperature of the electrode shield is approximately 500° C.

Figure 2:
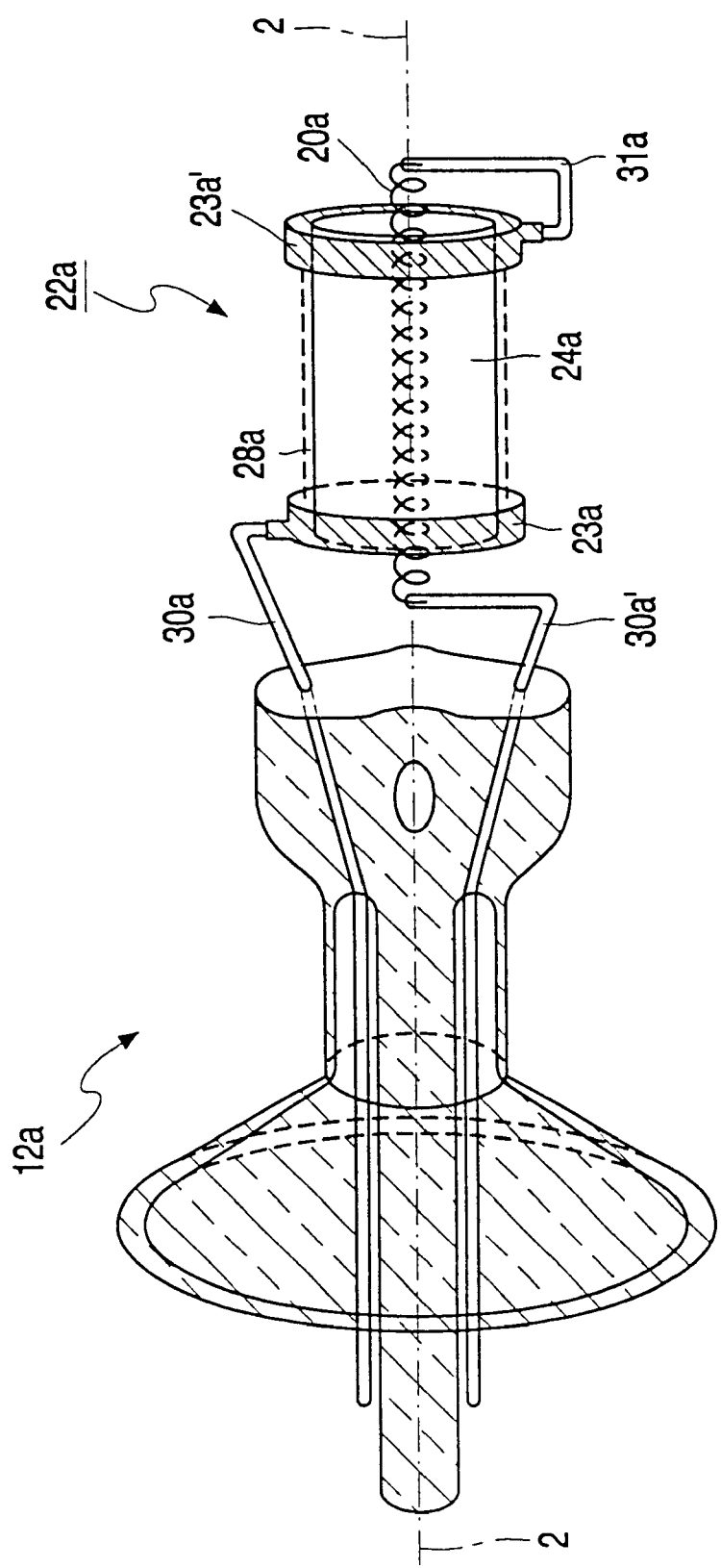
FIG. 2 shows a detail of FIG. 1, which is partly drawn in perspective.

FIG. 2 is a very diagrammatic, partly perspective view of a detail shown in FIG. 1, wherein the end portion 12a supports the electrode 20a and the electrode shield 22a via the current supply conductors 30a, 30a'. In this example, the electrode 20a is arranged so as to extend parallel to the longitudinal axis 2. In an alternative embodiment, the electrode is arranged so as to extend transversely to the longitudinal axis. The electrode shield is tubular (cylindrically symmetric) and comprises a shell-shaped body 24a, which is supported by two current distributors 23a; 23a'. Current-supply conductor 30a is connected to current distributor 23a, which is connected via the shell-shaped body 24a to the current distributor 23a'. Similarly, current distributor 23a' is connected via current conductor 31a to an end portion of the electrode 20a. The opposite end portion of the electrode 20a is connected to current-supply conductor 30a'. In this manner a current flow through the shell-shaped body 24a and the electrode 20a is initiated during operation. The current flowing through the body 24a causes the body 24a to heat up.

In the example shown in FIG. 2, the shell-shaped body 24a of the electrode shield 22a is made from DGA. At the high temperatures mentioned hereinabove, such a body is nondeformable and corrosion resistant and its heat emissivity is relatively low. In an alternative embodiment, the electrode shield is made from a doped ceramic material, such as so-called cermets (DGA doped with molybdenum and/or tungsten).

Furthermore, in the example shown in FIG. 2, the electrode shield 22a is provided with an electroconductive coating 28a, for example an approximately 30 nm thick layer of gold obtained, for example, by means of physical vapor deposition. The resistance of such a coating ranges between approximately 0.5Ω and approximately 3Ω, the preferred resistance value being approximately 1Ω. At a lamp current of 0.3–0.4 A, the electrode shield reaches a temperature of 500° C. or higher.

Instead of gold, use can be made of aluminum, silver or carbon as the material for the conductive coating. For the conductive coating use can also suitably be made of ITO, ATO, disilicides, such as molybdenum disilicide, and carbides, such as tantalum carbide. The thickness of the conductive coating and the resistivity of the material determine the conductivity of the material.

The electrode shield may be supported by a support wire (not shown in FIG. 2), if so desired. Preferably, such a support wire is entirely, or partly, made from stainless steel. Stainless steel has a comparatively very low coefficient of heat conduction, i.e. in comparison with the known materials (for example iron) used as a support wire.

Preferably, the electrode shield is provided with a lateral slit (not shown in FIG. 2). The electrode shield does not necessarily have to be tubular; it may alternatively be angular in shape, for example triangular, quadrangular or polygonal. In accordance with a further alternatively shape, the electrode shield is embodied so as to resemble a volute.

To enable the electrode shield 22a to reach temperatures above 450° C., preferably approximately 500° C., during operation, the outside surface of the shell-shaped body 24a of the electrode shield 22a may be provided with a low-emissivity coating (not shown in FIG. 2) to reduce radiation losses of the electrode shield 22a. Said low-emissivity coating preferably comprises a chromium film. In an alternative embodiment, the low-emissivity coating comprises a noble metal, for example a gold film. In a preferred embodiment, the conductive coating 28a also comprises the low-emissivity coating. The electrode shield 22a may additionally be provided with an absorbing coating 29a at an inner surface, which absorbing coating serves to absorb (heat) radiation (not shown in FIG. 2). The heat-absorbing coating 29a preferably comprises carbon.

It will be obvious that within the scope of the invention many variations are possible to those skilled in the art. The discharge vessel does not necessarily have to be elongated and tubular; it may alternatively take different shapes. In particular, the discharge vessel may be curved in shape, for example like a meander or like a bend as used in a so-called compact fluorescent lamp.

The scope of protection of the invention is not limited to the above examples. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an " in front of an element does not exclude the presence of a plurality of such elements.

What is claimed is:

1. A low-pressure mercury-vapor discharge lamp comprising a discharge vessel (10),
    which said discharge vessel (10) encloses a discharge space (13) containing a filling of mercury and an inert gas in a gastight manner,
    electrodes (20a; 20b) being arranged in the discharge space (13) for maintaining a discharge in said discharge space (13),
    and an electrode shield (22a; 22b) surrounding at least one of the electrodes (20a; 20b), characterized in that,
    the electrode shield (22a; 22b) carries a direct electric current during operation, and
    the temperature of the electrode shield (22a; 22b) during nominal operation is above 250° C.

2. A low-pressure mercury-vapor discharge lamp as claimed in claim 1, characterized in that the temperature of the electrode shield (22a; 22b) during nominal operation exceeds 450° C.

3. A low-pressure mercury-vapor discharge lamp as claimed in claim 1 or 2, characterized in that the electrode shield (22a; 22b) electrically contacts the electrode (20a; 20b) via a current conductor (31a; 31b).

4. A low-pressure mercury-vapor discharge lamp as claimed in claim 3, characterized in that the discharge vessel is provided with a first and a second current-supply conductor (30a, 30a'; 30b, 30b'), which issue from the discharge vessel (10) to the exterior,
    the first current-supply conductor (30a, 30b) electrically contacting the electrode shield (22a; 22b) and the second current-supply conductor (30a', 30b') electrically contacting the electrode (20a; 20b).

5. A low-pressure mercury-vapor discharge lamp as claimed in claim 1 or 2, characterized in that the conductivity of the current-carrying portion of the electrode shield (22a; 22b) is such that, during nominal operation, the power dissipation lies in a range from 0.1 to 10 Watts.

6. A low-pressure mercury-vapor discharge lamp as claimed in claim 5, characterized in that the power dissipation during nominal operation lies in a range from 0.5 to 5 Watts.

7. A low-pressure mercury-vapor discharge lamp as claimed in claim 1 or 2, characterized in that the electrode shield (22a; 22b) is made from a ceramic material or carbon.

8. A low-pressure mercury-vapor discharge lamp as claimed in claim 1 or 2, characterized in that the current-carrying portion of the electrode shield (22a; 22b) comprises an electroconductive coating (28a) which is applied to the electrode shield.

9. A low-pressure mercury-vapor discharge lamp as claimed in claim 8, characterized in that the electroconductive coating (28a) comprises a material selected from the group formed by gold, silver, aluminum, carbon, indium tin oxide (ITO), antimony tin oxide (ATO), disilicides and carbides.

10. A low-pressure mercury-vapor discharge lamp as claimed in claim 1 or 2, characterized in that the electrode shield (22a; 22b) is provided, at a side facing away from the electrode (20a; 20b), with a low-emissivity coating for reducing the radiation losses of the electrode shield (22a; 22b).

* * * * *